US009898495B2

(12) United States Patent
Eberlein et al.

(10) Patent No.: US 9,898,495 B2
(45) Date of Patent: *Feb. 20, 2018

(54) ZERO DOWNTIME UPGRADE FOR DATABASE APPLICATIONS WITH ALTERING SEQUENCES

(71) Applicants: Peter Eberlein, Malsch (DE); Volker Driesen, Heidelberg (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 284 days.

This patent is subject to a terminal disclaimer.

(21) Appl. No.: 14/629,432

(22) Filed: Feb. 23, 2015

(65) Prior Publication Data

US 2016/0246833 A1  Aug. 25, 2016

(51) Int. Cl.
  *G06F 9/445* (2006.01)
  *G06F 17/30* (2006.01)

(52) U.S. Cl.
  CPC .......... *G06F 17/30351* (2013.01); *G06F 8/67* (2013.01); *G06F 17/30297* (2013.01)

(58) Field of Classification Search
  CPC ......... G06F 17/30297; G06F 17/30377; G06F 17/30351; G06F 8/67; G06F 8/65
  See application file for complete search history.

(56) References Cited

U.S. PATENT DOCUMENTS

| | | | |
|---|---|---|---|
| 5,717,924 A | 2/1998 | Kawai | |
| 5,995,980 A | 11/1999 | Olson et al. | |
| 6,128,588 A * | 10/2000 | Chacon | G03F 7/705 703/6 |
| 6,304,882 B1 | 10/2001 | Strellis et al. | |
| 6,850,938 B1 * | 2/2005 | Sadjadi | G06F 17/30362 |
| 7,117,229 B2 | 10/2006 | Marshall et al. | |
| 7,353,231 B1 | 4/2008 | Eslambolchi et al. | |
| 7,523,142 B2 | 4/2009 | Driesen et al. | |
| 7,587,435 B2 | 9/2009 | Shepherd | |
| 7,797,290 B2 | 9/2010 | Nishino et al. | |
| 7,908,299 B2 | 3/2011 | Barbarek | |
| 8,200,634 B2 | 6/2012 | Driesen et al. | |
| 8,229,579 B2 | 7/2012 | Eldridge et al. | |
| 8,266,180 B2 | 9/2012 | Zazrivec et al. | |
| 8,301,609 B1 * | 10/2012 | Dryfoos | G06F 17/30377 707/704 |

(Continued)

*Primary Examiner* — Jorge A Casanova

(74) *Attorney, Agent, or Firm* — Mintz Levin Cohn Ferris Glovsky and Popeo, P.C.

(57) ABSTRACT

An upgrade of a first version of a database application to a second version of a database application that both have a same data schema is initiated. The first database application has a first access schema such that at least one table in the data schema is linked to the first access schema. The second version of the database application has a second access schema such that at least one database table in the data schema is linked to the second access schema. The first access schema differs from the second access schema. During the upgrade, each access schema is provided access to a first sequence in the data schema for both of the first version of the database application and the second version of the database application. Subsequent to the upgrade, the second version of the database application is provided access to a second sequence in the data schema.

20 Claims, 15 Drawing Sheets

(56) References Cited

U.S. PATENT DOCUMENTS

| | | |
|---|---|---|
| 8,417,737 B2 | 4/2013 | Hopmann et al. |
| 8,479,187 B2 | 7/2013 | Driesen et al. |
| 8,521,706 B2 | 8/2013 | Alpern et al. |
| 9,519,675 B2 * | 12/2016 | Specht ................. G06F 8/67 |
| 9,639,448 B2 * | 5/2017 | Gebhard ............. G06F 11/36 |
| 9,665,365 B2 * | 5/2017 | Buzsaki ................ G06F 8/67 |
| 2002/0178077 A1 | 11/2002 | Katz et al. |
| 2004/0015953 A1 | 1/2004 | Vincent |
| 2005/0138013 A1 * | 6/2005 | Walker ............ G06F 17/3048 |
| 2005/0251523 A1 | 11/2005 | Rajamani et al. |
| 2008/0098046 A1 * | 4/2008 | Alpern ........... G06F 17/30306 |
| 2008/0115134 A1 | 5/2008 | Elliott et al. |
| 2009/0019094 A1 | 1/2009 | Lashley et al. |
| 2009/0313309 A1 * | 12/2009 | Becker ........... G06F 17/30595 |
| 2010/0088281 A1 | 4/2010 | Driesen et al. |
| 2010/0162226 A1 | 6/2010 | Borissov et al. |
| 2011/0107135 A1 | 5/2011 | Andrews et al. |
| 2011/0246419 A1 | 10/2011 | Yancey et al. |
| 2014/0059530 A1 * | 2/2014 | Banavalikar ......... G06F 9/4406 717/170 |
| 2014/0101644 A1 * | 4/2014 | Buzaski ........... G06F 17/30174 717/168 |
| 2014/0101646 A1 | 4/2014 | Buzaski et al. |

* cited by examiner

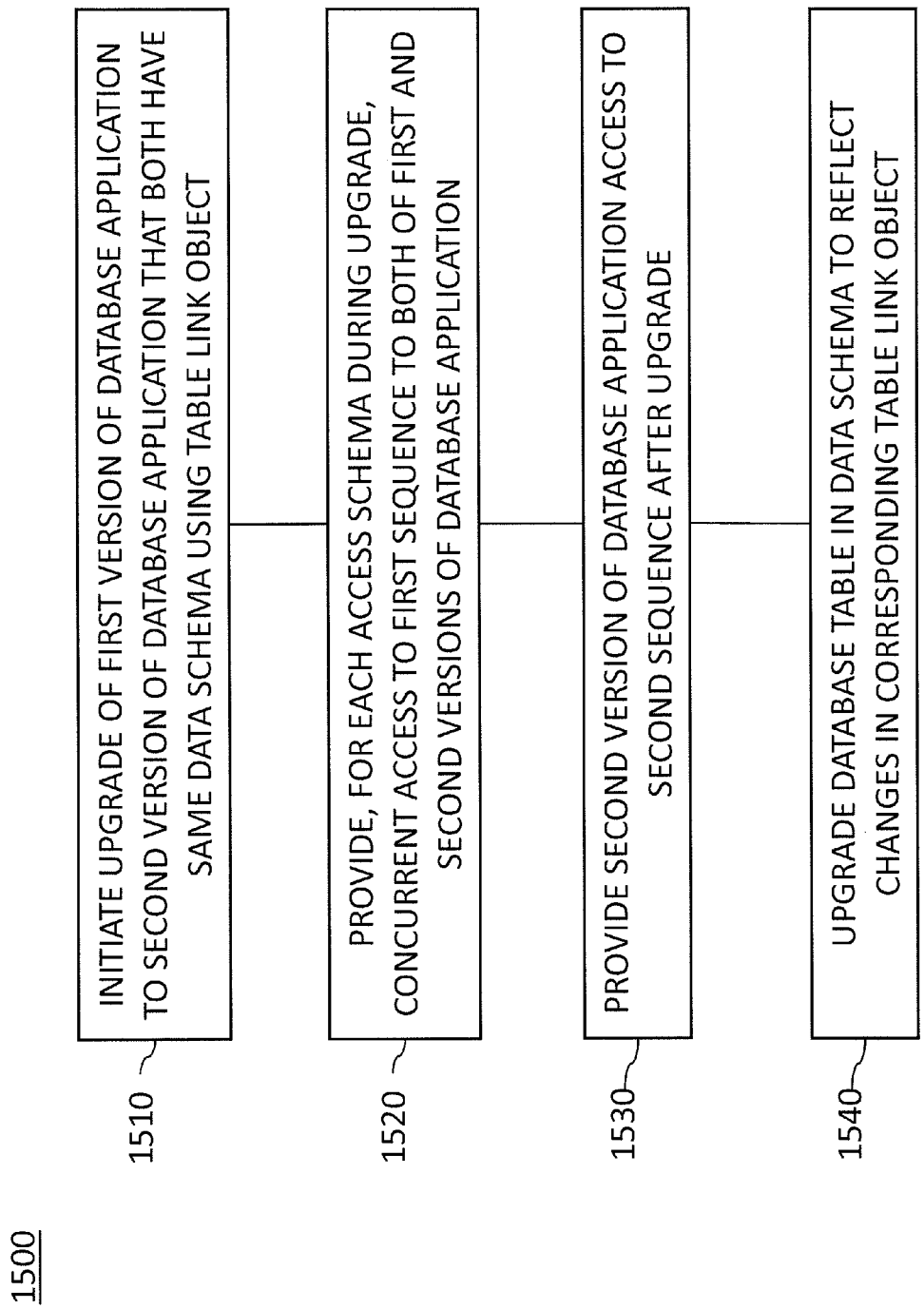

ZERO DOWNTIME UPGRADE FOR DATABASE APPLICATIONS WITH ALTERING SEQUENCES

TECHNICAL FIELD

The subject matter described herein relates to the altering of sequences used by tables as part of a zero downtime upgrade procedure of a database application.

BACKGROUND

Deployment of maintenance packages to computing platforms often require downtime of such platforms. At the beginning of downtime, a backup is created and this backup serves as a fallback option, in case the upgrade fails. Advancements in technology have enabled for reduced, and in some cases, minimal downtime upgrades. With such arrangements, upgrades run in parallel to a production system within the same database for the complete duration of the upgrade. The upgrade procedure creates clones of the tables, which are changed by the upgrade and runs database triggers to replicate data from production to the upgrade copy of the tables.

However, such upgrade procedures are not well equipped to handle tables as they can result duplicate numbers in the fields where the usage of the sequence should create a unique number in each field. Further, with upgrade procedure, there can be upgrade reports, which copy data from the old to the new table which must preserve sequence field values. In parallel, there can be inserts into the new table of new data which much use the next value of the sequence to insert new rows. With such an arrangement, there must be one sequence that is used for the old table and the new table.

SUMMARY

In one aspect, an upgrade of a first version of a database application to a second version of a database application that both have a same data schema is initiated. The first database application has a first access schema such that at least one table in the data schema is linked to the first access schema. The second version of the database application has a second access schema such that at least one database table in the data schema is linked to the second access schema. The first access schema differs from the second access schema. During the upgrade, each access schema is provided access to a first sequence in the data schema for both of the first version of the database application and the second version of the database application. Subsequent to the upgrade, the second version of the database application is provided access to a second sequence in the data schema.

The first sequence can be a sequence used by the first version of the database application prior to the upgrade.

The first sequence can be a temporary sequence that is different from a sequence used by the first version of the database application prior to the upgrade.

The access to the first sequence can be enabled by a respective at least one sequence pointer in each of the first access schema and the second access schema.

The concurrent access can be enabled by a field in a respective at least one table in each of the first access schema and the second access schema.

Values from the first sequence can be migrated from a first database table in the data schema to a second database table in the data schema.

Values from the first sequence can be mapped from a first database table in the data schema to a second database table in the data schema.

Each access schema can be provided with concurrent access to at least one database table in the data schema to both the first version of the database application and the second version of the database application. This concurrent access can be enabled by a respective at least one table link object in each of the first access schema and the second access schema that is used by database views or stored procedures such access schema. The at least one database table in the data schema is updated to reflect changes in a corresponding table link object using at least one application trigger associated with the at least one table link object. There can be a first application trigger in the first access schema on the first table link and a second application trigger in the second access schema on a second table link. Only the first application trigger can be called if the table in the data schema is updated through the first table link object in the first access schema and only the second application trigger can be called if the table in the data schema is updated through the second table link object in the second access schema.

The at least one table link can specify a select field list of the at least one table in the data schema. The list of fields specified by the table link object can be smaller than the list of fields of the table. The at least one table link object can be used by a database object that cannot use a database view. At least one of the table link objects can specify a calculated field. The calculated field can be transient. The at least one table link object can reference a table in the data schema that specifies a calculated field.

The database application can be executed using an in-memory database system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, with the current subject matter, new software is deployed in parallel to old software while, at the same time, as much persistency as possible is reused. Such an arrangement provides an in-place upgrade in which, if the upgrade writes to persistency, either due to content delivery or due to data migration activities, the data for the respective database tables is duplicated. This approach minimizes the additional memory consumption during the upgrade procedure as compared to conventional techniques while, at the same time, avoiding duplicate records.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 15 is a process flow diagram illustrating altering of sequences as part of an upgrade procedure.

Like reference symbols in the various drawings indicate like elements.

DETAILED DESCRIPTION

The current subject matter enables changing the definitions of DB sequences and sequence fields in zero downtime upgrades. Various types of zero downtime maintenance/upgrade procedures can be utilized such as that described in U.S. Pat. App. Pub. No. 20130238555 entitled: "Aliases for accessing shared tables during provision of continuous access during application upgrade" and in U.S. Pat. App. Pub. No. 20130238868 "Using temporary system to provide continuous access during application upgrade", the contents of both of which are hereby fully incorporated by reference. As will be described in further detail below, if a table is populated during the upgrade, the upgrade procedure creates a copy of the table, installs a database trigger to replicate all changes done by production from the production table to the upgrade's copy. At the end of the upgrade, the access of production is switched to the target table.

Figure 1:
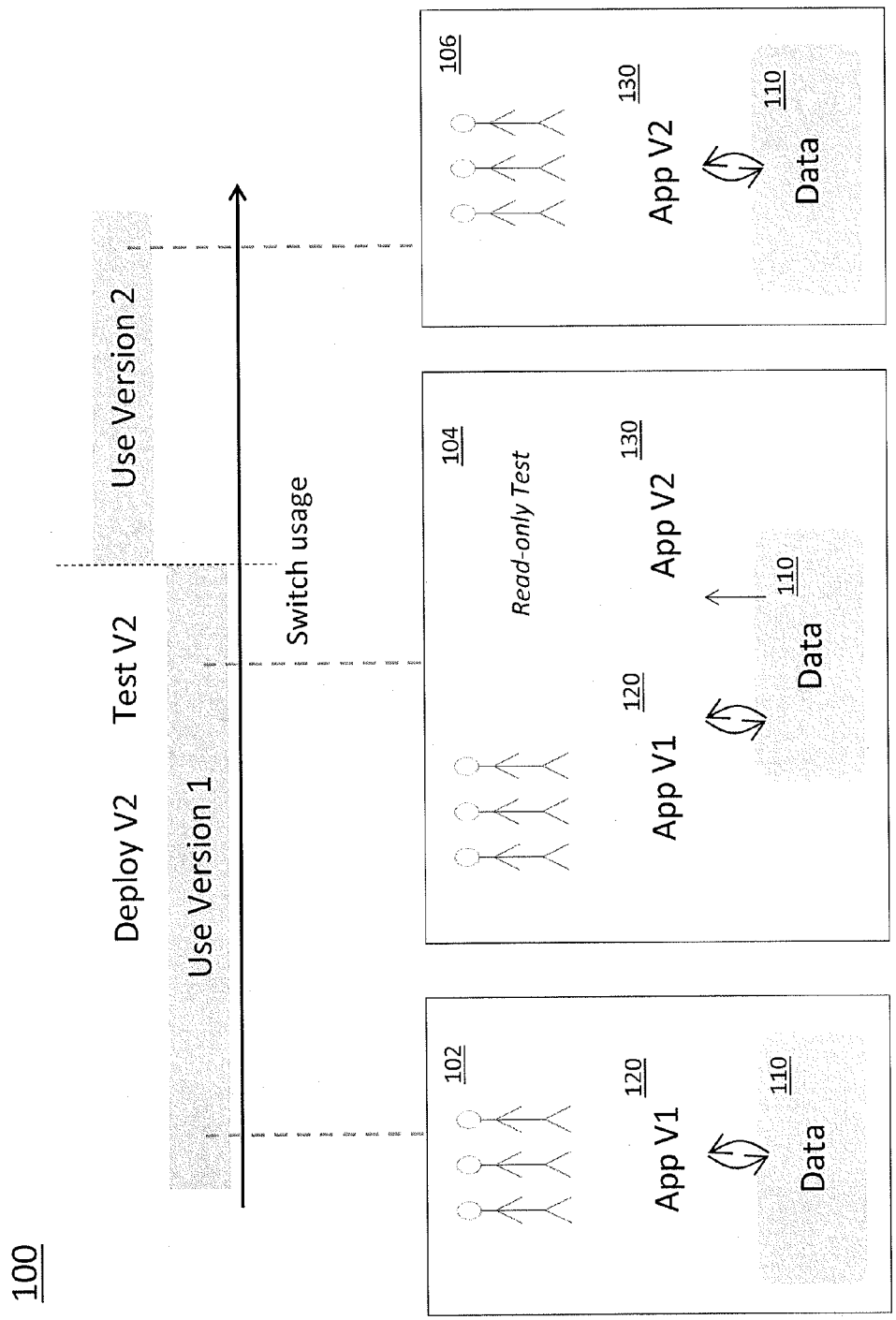
FIG. 1 is a process flow diagram illustrating phases of a zero downtime upgrade.

FIG. 1 is a diagram 100 illustrating an approach to deploy an upgrade across three separate phases 102, 104, 106 with zero downtime. Initially, in the first phase, an application version 1 (V1) 120 as part of its operations performs read and writes on a database 110. Thereafter, in a subsequent phase 104, a second version of the application (application V2 13) is deployed and tested. During such testing, the interaction of application V2 130 with the database 110 can be limited to read only testing (as opposed to being able to perform both read and write operations on the database 110). Once the testing of application V2 130 has been completed, a switchover can be performed, in phase 106, in which application V2 130 is the sole application interacting (via read and write operations) on the database 110. In some cases, the switchover can be accomplished with zero downtime (i.e., there is always one application executing on the database 110).

Figure 2:
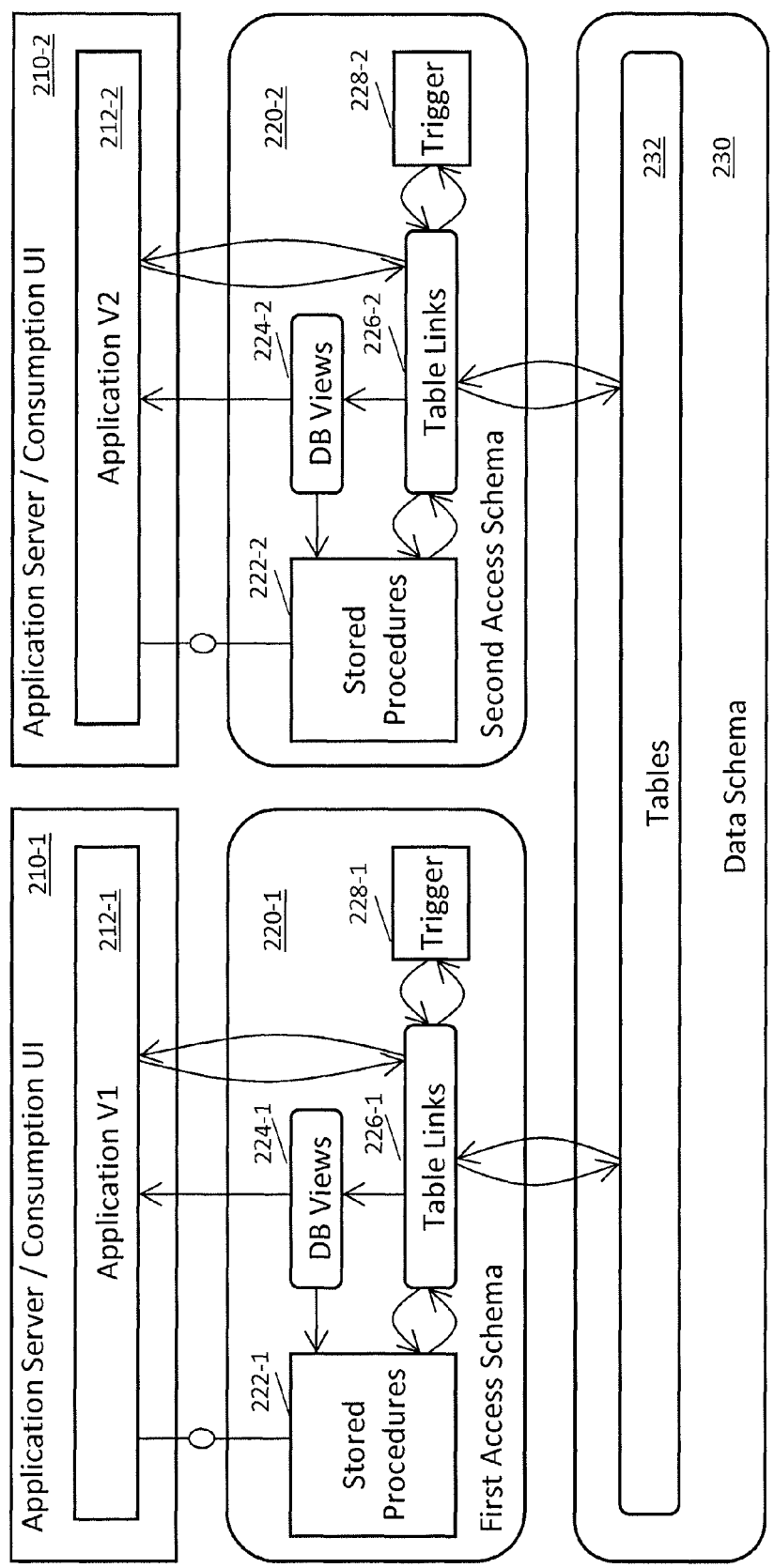
FIG. 2 is a system diagram illustrating a zero downtime upgrade using table links.

With reference to diagram 200 of FIG. 2, the general idea of an in-place upgrade procedure is to deploy the software twice, while, at the same time, keeping the main part of the data in a single representation. The only data that can be held in two representations is that data which is changed by the upgrade—either due to content deployment or due to structure changes of the database tables (duplicates are not needed for new fields).

Two versions of application software 212-1 and 212-2 can be accessed, for example, on a client via a respective application server/consumption user interface (on a client device) 210-1, 210-2. In order to main data mainly as a singleton (i.e., a single representation), while being able to deploy the software twice (via application version 1 212-1 and application version 2 210-2), the deployed software (application V1 212-1 and application V2 212-2) can access underlying data in tables 232 in a data schema 230 (or in some cases multiple data schemas) by using different database access schemas 220-1, 220-2. Within some database systems (e.g., an in-memory database such as the HANA platform offered by SAP SE), not only can database tables be used, but also database views 224-1, 224-2, stored procedures 222-1, 222-2 (subroutines available to applications that access a relational database system, etc.), scripts and the like. All of these elements can be created in an access schema 220-1, 220-2 which can, as an analogy, acts as a proxy/interface to the underlying data stored in the tables 232 in the data schema 230. The data stored in tables 232 can be stored in the data schema 230 and can be published to the respective access schema 220-1, 220-2 holding the application code and views via a table link 226-1, 226-2 (as described in further detail below). The database views 224-1, 224-2 are results sets of stored queries on the data in the tables 232 which the server/users 210-1, 210-2 can query just as they would in a persistent database collection object.

During an upgrade, a second access schema 220-2 is created. Then, the tables 232 can be exposed to this second access schema 220-2 via a new table link 226-2, the views 224-2 can be created and the software for application V2 212-2 can be deployed. During deployment of the new application V2 212-2, the tables 232 can be set to read only access for the second access schema 220-2. If the database tables 232 need to be written to or structurally changed by the upgrade, the database tables 232 can be copied and the copy can be exposed to the second access schema 220-2 under its original name.

The table link 226-1, 226-2 can be a database objet type that is either standalone or it can be an attribute for an existing database view or database synonym/alias. The table links 226-1, 226-2 can be created in each access schema 220-1, 220-2 and can be consumed by some or all database objects in the access schema such as calculation views, analytical views, stored procedures, database triggers, database built in functions (e.g., calculation engine functions, etc.) like unit conversion or quantity conversion or calendar functions and other objects.

The table links 226-1, 226-2 can each act like a view to the database tables 232 allowing only "to select" operations from one table (while omitting data fields and not omitting key fields). There can be different types of table links 226-1, 226-2, for example, there can be a table link type for row tables and one for column tables. The name of the table links 226-1, 226-2 and the names of the table can differ. In order to allow adding new fields to a table without needing to clone it, a field list can be defined which can be exposed by the table link 226-1, 226-2 such that only data fields can be omitted. If an update happens to the table link 226-1, 226-2 and a data field is not available in the table link but in the table, the field in the table shall be updated with a database default value for the field. In other words, the table links 226-1, 226-2 can be characterized as synonyms with the option to specify the selected fields as in a view.

Updates to the table links 226-1, 226-2 by the applications 212-1, 212-2 can cause the table links 226-1, 226-2 to update the database table 232. In addition, the table links 226-1, 226-2 can fill fields in the database table 232 that are not referenced with default values. Select for update on the table links 226-1, 226-2 can be executed on the table 232 so that entries there are locked.

The table links 226-1, 226-2 can additionally allow for the definition of triggers 228-1, 228-2 (when associated with table links they are referred to herein as application triggers). The application triggers 228-1, 228-2 associated with the table links 226-1, 226-2 can be objects encapsulating procedural code that can be automatically executed in response to certain events on the table links 226-1, 226-2. The table links 226-1, 226-2 can also allow for the generation of calculated fields (as will be described in more detail below).

Figure 3:
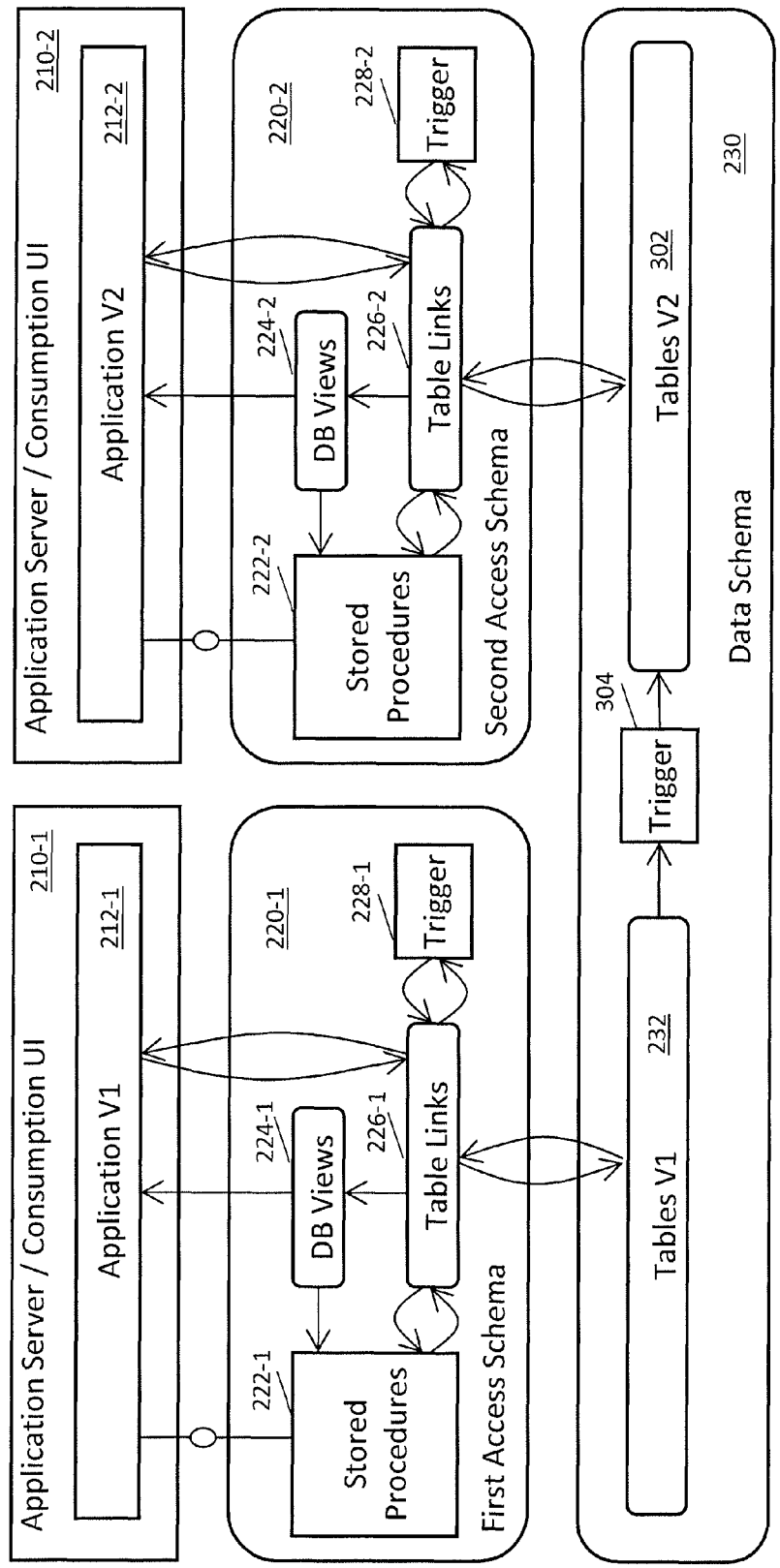
FIG. 3 is a system diagram illustrating a zero downtime upgrade using table links and cloned tables.

As part of a zero downtime upgrade, application triggers 228-1, 228-2 can be created on the table link 226-1, 226-2 in the respective access schema 220-1, 220-2 instead of creating them on the database tables 232 in the data schema 230. The application triggers 228-1, 228-2 can act to only fire for updates for the table links 226-1, 226-2 in the access schema 220-1, 220-2 in which it was created. Further, in some cases, an application trigger 228-1, 228-2 can be created for the table link 226-1, 226-2 and a database trigger 304 (see diagram 300 of FIG. 3) for tables 232, 302.

Application triggers 228-1, 228-2 have to be created in the access schema 220-1, 220-2, as this way, they can be updated to a new version easily and the application triggers 228-1, 228-2 can call stored procedures 222-1, 222-2 in the corresponding schema 220-1, 220-2 and access all other database objects locally in the schema 220-1, 220-2.

During the upgrade, two application triggers 228-1, 228-2 can be deployed: the application version 1 trigger 228-2 is active in the first access schema 220-1 and the application version 2 trigger 228-1 is active in the second access schema 228-2. If an update is done in the first access schema 220-1 on the table link 226-1, the application trigger 228-1 in the first access schema 220-1 shall fire, but not the trigger in the second access schema 220-2 and vice versa.

In this scenario, the upgrade procedure may also define triggers 304 in the data schema 230 on the database tables to populate new fields. During an upgrade, there can potentially be a clone of the table (so that there are tables V1 232 and tables V2 302). The clone process can be done with a database trigger 304. In this arrangement, there can be application triggers 228-1, 228-2 in the access schemas 220-1, 220-2 defined by the application and database triggers 304 in the data schema 230 defined by the upgrade procedure. These database triggers 304 can execute the updates done to the original table (table V1 232) also on the copy table (table V2 302).

In this case (as illustrated in diagram 300 of FIG. 3), an update to table link 226-1 in the first access schema 220-1, can trigger the corresponding application trigger 228-1 as well as the database trigger 304 in the data schema 230.

Figure 4:
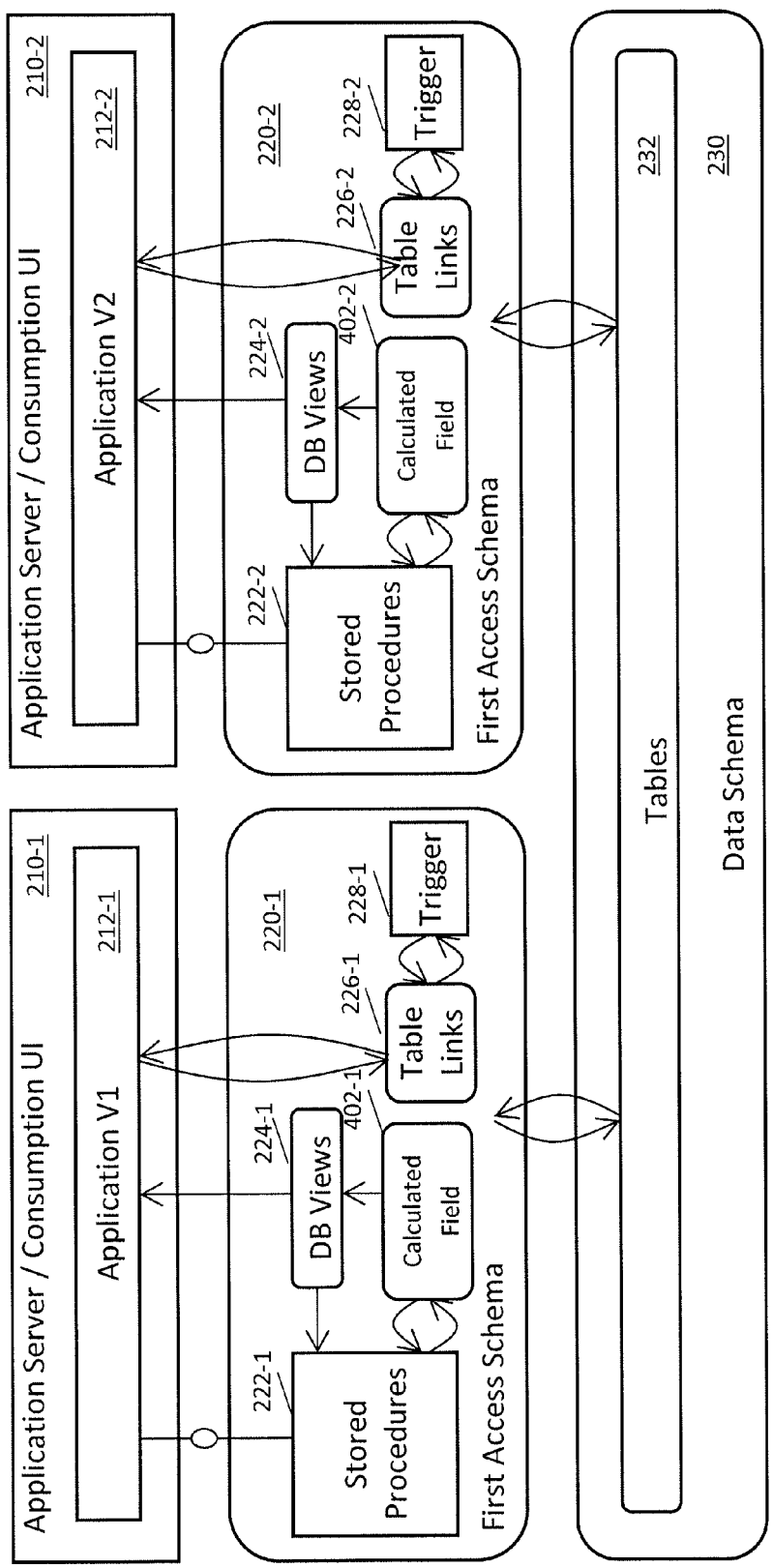
FIG. 4 is a system diagram illustrating a zero downtime upgrade using table links and transient calculated fields.
Figure 5:
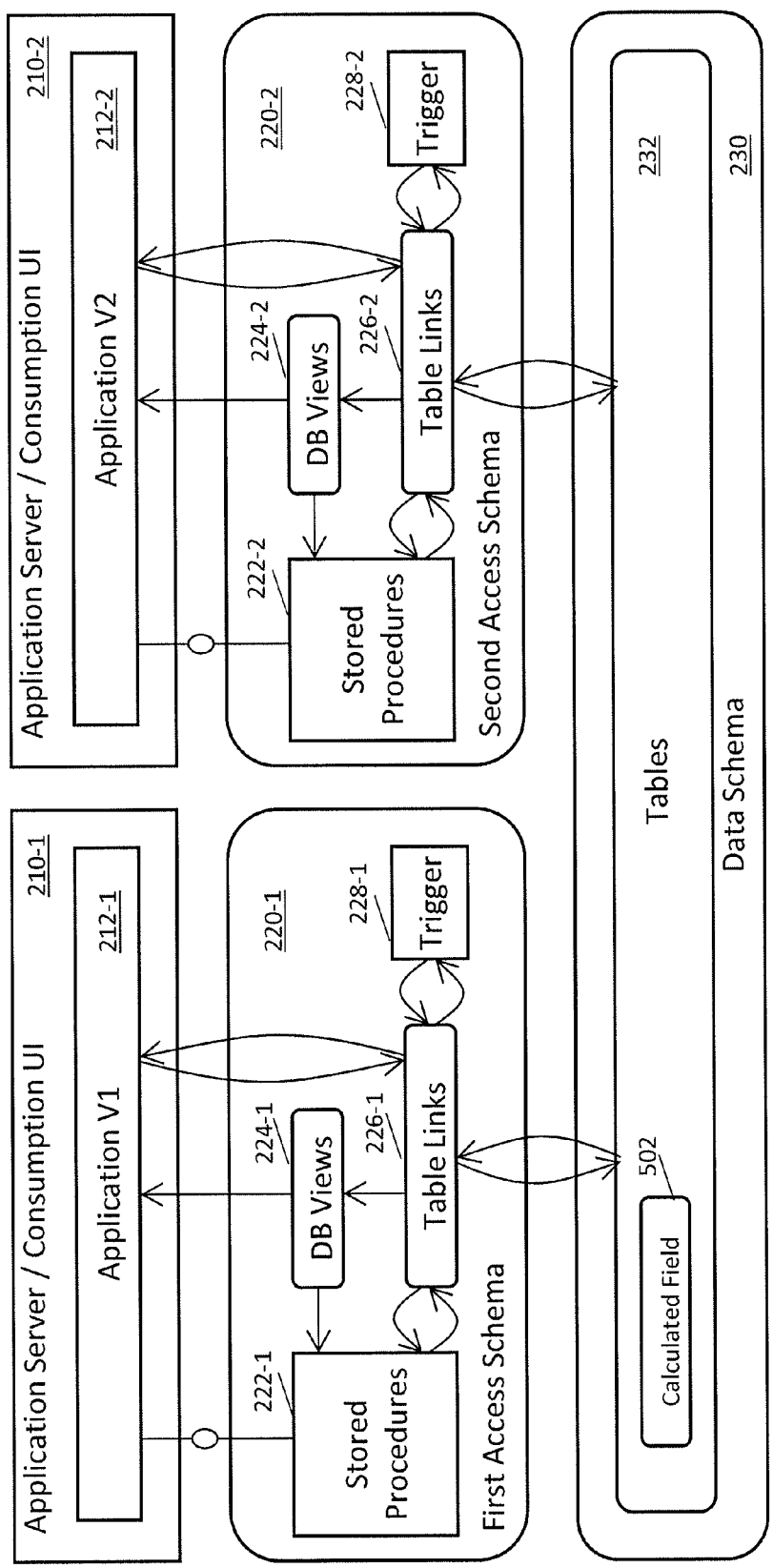
FIG. 5 is a system diagram illustrating a zero downtime upgrade using table links and persisted calculated fields.

Still further, calculated fields can be provided. For example, with reference to diagram 400 of FIG. 4, transient calculated fields 402-1, 402-2 can be defined in the access schemas 220-1, 220-1. In addition, as described below in connection with diagram 500 of FIG. 5, persisted calculated fields 502 can be defined in the data schema 230.

A transient calculated field 402-1, 402-2 is not persisted in the database tables 232. The values for the calculated field 402-1, 402-2 can be computed upon select. With the current subject matter, a transient calculated field 402-1, 402-2 can be defined only on the corresponding table links 226-1, 226-2, not on the tables 323 in the data schema 230. This arrangement allows for the changing of calculated field logic in a new software release without the need to copy the complete table 232. Further, this approach can also enable the calculated field 402-1, 402-2 to call custom code deployed as a stored procedure.

If the field is persisted, the situation is different. The calculated field 502 (i.e., field value) can be stored in the data schema 230. This can be defined by the statement "GENERATED ALWAYS AS <expression>" in the database table create statement. The expression to create the field value may in this case not call external database code as such code can only be deployed once (in the data schema 230).

If such a persisted calculated field 502 is changed—a new expression can be defined and delivered with the upgrade— the database table 232 needs to be cloned to create the new field with the content computed along the new statement in a cloned table 302. In this case, the database trigger 304 may not write to the calculated field 502 but, rather, the table logic can compute the field content.

Figure 6:
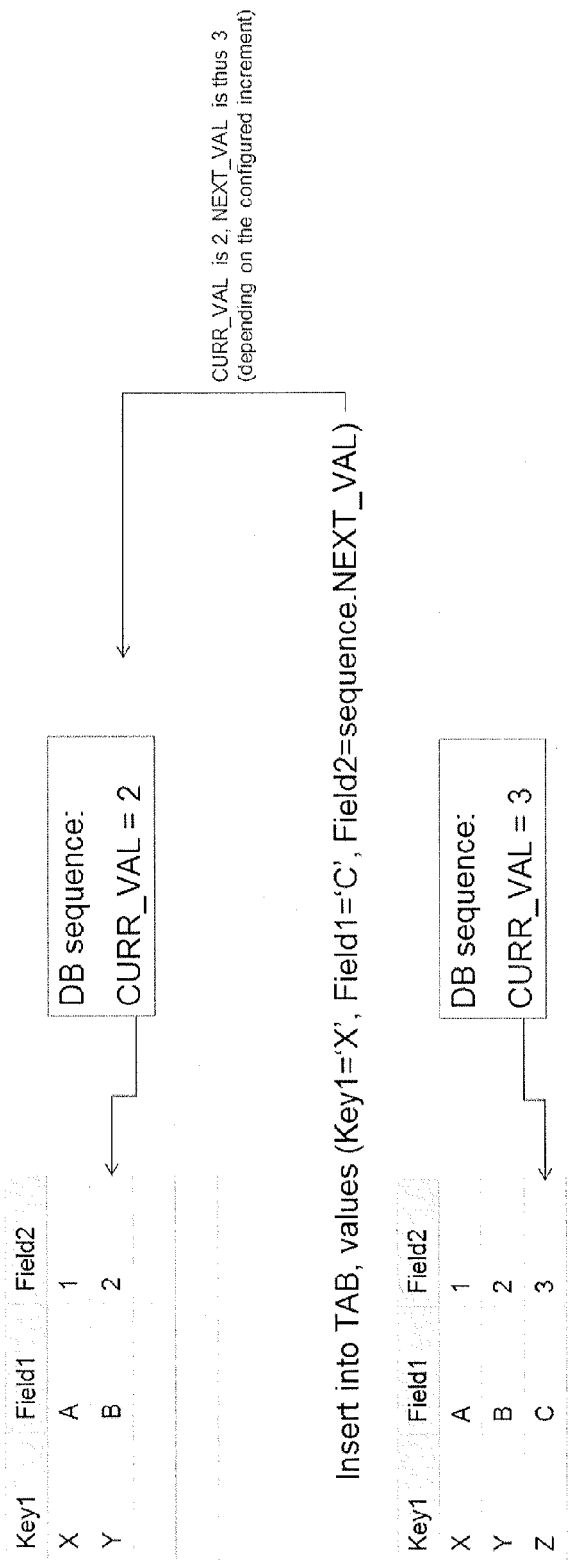
FIG. 6 is a diagram illustrating usage of a sequence.

As mentioned above and with reference to diagram 600 of FIG. 6, a database sequence can hold persistency of a current value (also referred to as CURR_VAL) which is the last value provided by a sequence and a configuration such as:
  INCREMENT: the increment applied to CURR_VAL to get next value (NEX_VAL);
  MINVAL: the configuration of the minimum value of the sequence;
  MAXVAL: the configuration of the maximum value of the sequence;
  CYCLE/NO-CYCLE: configuration, if the sequence starts again from MINVAL, if MAXVAL has been reached (and vice versa for decreasing sequences).

If the sequence is altered only upon the switch of the user from software version 1 (V1) to software version 2 (V2), the upgrade data migration cannot use the new database sequence format. Adjustments to the sequence configuration, which needs to be used during data migration, must be done after the switch to version 2. However, in such cases, there is necessarily downtime because it is not possible to remain up and running for users given the limitations regarding sequences.

Depending on the sequence configuration change, existing sequence numbers used in tables have to be migrated. This migration cannot be done in-place in an existing table, as this table is being actively used. Furthermore, if the sequence numbers are used in associations, the sequence number in the associated table also needs to be changed.

Further, there can be problems with migrating existing entries in tables that were created by a sequence and used in foreign table associations. For example, Table A key-field-1 has an association to Table B field-3. During migration, A.key-field-1 and B.field-3 need to be changed consistently. The problem is, for a migration, both entries are copied separately by an own batch. Later, the entries are copied by two different triggers.

Therefore, an ordering is required namely to first migrate the table with the field, which is primarily filled with the sequence, then the associated table. Most likely the table, where the sequence number is stored in a key field should be migrated first. For the triggers, the tables B and A need to be updated consistently with the new sequence number.

The following is directed to a zero downtime database upgrade procedure (ZDM) for changing sequences. Provided is process to upgrade the database system using a sequence, having the option to migrate sequence numbers, if required.

Initially as part of a process, a developer can decide, if values are migrated or not. Such decision can then be delivered to a deploy tool. It can then be decided whether or not each table is cloned. Options can include C1: table needs to be migrated due to structure change, C2: table needs to be copied due to deployment of new content, and C3: table needs to be copied due to migration of sequence values (decision by developer, etc.).

Further, there can be deploy procedures that can act as alternatives (e.g., deploy procedures P1, P2-1, P2-2, etc.). For example, with deploy procedure P-1, a table is not copied. A new access schema can be set up with links to and original sequence and original table.

With deploy procedure P2-1, a table is copied but the sequence values are not migrated. A table copy can be first set up as empty. A new access schema can be set up with links to the original sequence and a link to the table copy. A data copy can copy content in batch while not changing values. Data replication can be accomplished via a trigger copying content while not changing values. Further, data deployment can use the original sequence to create new unique values for data imported to table copy.

With deploy procedure P2-2, the table can be copied and sequence values migrated. An empty table-copy can be set up as well as a new temporary sequence for range B\A (see, for example, FIG. 10 and accompanying description below). A target sequence can be set up with a new name. A new access schema can be set up with a link to the target sequence and a link to the table-copy Data can be copied via batch in which sequence values are changed. If (curvalold<minvalnew and minvalnew<<maxvalold) then set curval to minvalnew" rule. This arrangement ensures more use cases run into the following (a) not (b), and (a) is easier: (a) if CURR_VAL is in A intersection B, the table content can be copied and Sequence numbers in the table A are copied; or (b) if CURR_VAL is in A without B, the table content can be copied, the sequence value can be mapped to B without A (thus the temporary sequence SA_T can be taken). If there is an associated table, the tables can be updated with the associated fields. This updating can be done by first copying the table where the field is not in the key. Next, the table can be copied where the field is in the key, and if the value is changed the values in the associated tables can also be altered.

With data replication in the trigger, values are changed. If CURR_VAL is in A intersection B, then the table content and the sequence numbers can be copied. If CURR_VAL is in A without B, then the table content can be copied and the sequence value can be mapped to B without A (thus take temporary sequence SA_T can be taken). If there is an associated table, the tables can be updated with the associated fields. However, problems can arise when both content is transferred with different triggers in the same database transaction. The solution in this regard is that the trigger with the associated field (not in a key) can wait until the trigger updating the table where the field is in the key has written data, then it can read the value and update the associated field. This is can be done with one trigger transferring data for associated tables.

The deployment tool can use either original or temporary sequence. The original sequence can be used to get next-val, if the returned value is in A intersection B, it is used, otherwise the temporary sequence can be used to get another next-val. The deploy tool can update the tables with the associated fields automatically and correctly.

As part of the upgrade, usage of V1 is ultimately stopped. With scenario P1, the sequence can be altered. If (cur-val-old<min-val-new and min-val-new<<max-val-old), set sequence cur-val to min-val-new. With scenario P2-2, the target sequence can be set up with a new name and a new access schema can be set up with a link to the target sequence and link to the table-copy. V2 can then be enabled. Sequence A_new can then be initialized with application defined function for new sequence (typically "max-val" of field holding sequence number+1).

With the current subject matter, one sequence can be for both schemas V1 and V2, or, alternatively, a single temporary sequence can be used during the upgrade and the sequence can be switched to the target version of the sequence after the upgrade, depending on the configuration change of the sequence and the decision, whether to migrated existing values which have been created using the sequence or not. Below is described how to select the scenario depending on the configuration change of the sequence.

When using a database sequence object, the sequence can be stored in the data schema and the sequence can be exposed to the access schema via a sequence link. For most databases, a synonym can do this job (i.e., act as the sequence link). Such a mechanism can also permit the use of two sequences during the upgrade, while, at the same time, hiding the underlying complexity from the application. With this approach the code deployed to the access schema can access the sequence locally in the schema and does not need to specify the data schema.

During the upgrade, in some scenarios, a temporary sequence can be created and used in the data migration and data import tools instead of the original or target sequence to ensure that duplicate records are not created.

Figure 7:
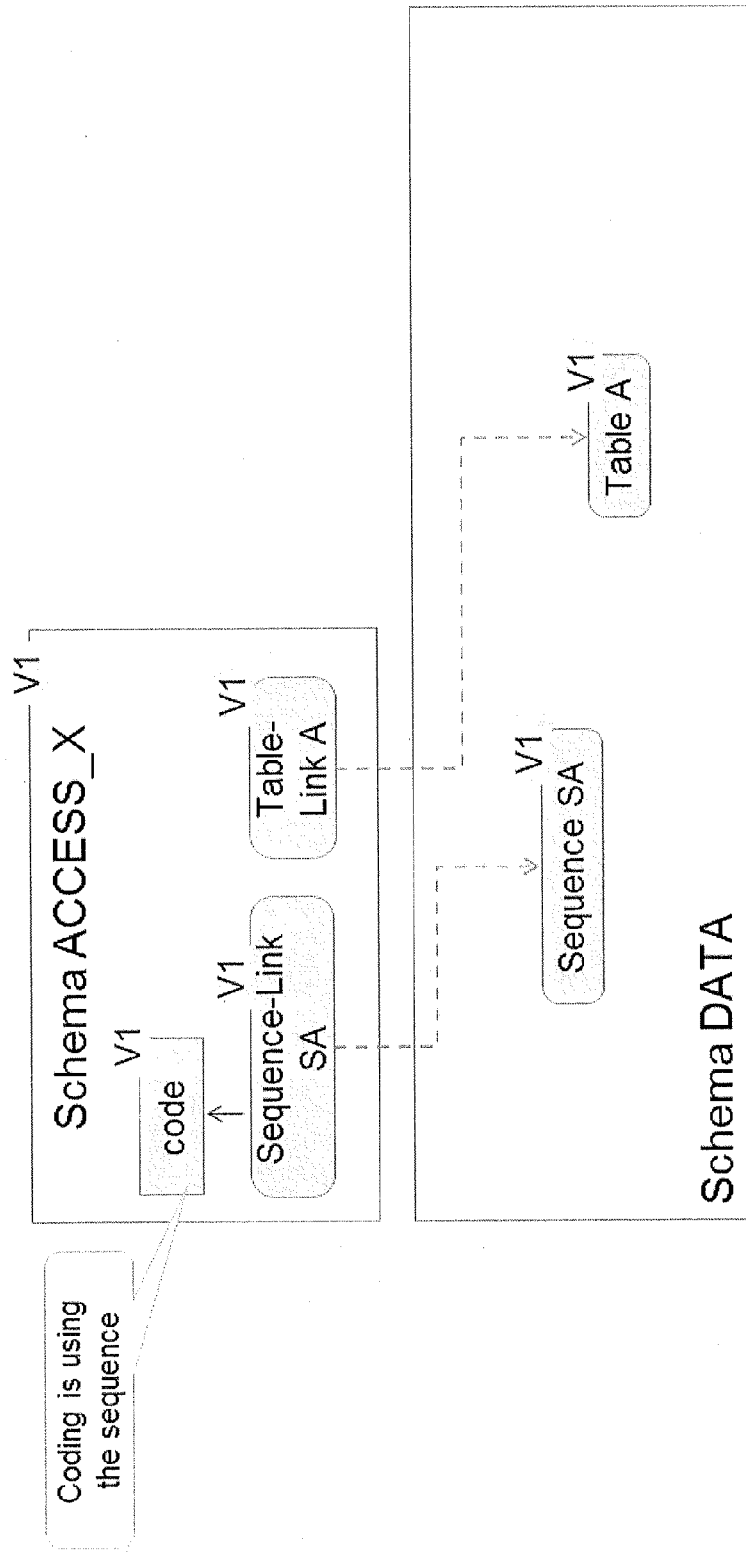
FIG. 7 is a diagram illustrating an access schema and a data schema prior to an upgrade procedure.

FIG. 7 is a diagram 700 in which the sequence is called SA and it is created in schema DATA. The sequence link is created in schema ACCESS_X: create sequence_link SA for DATA.SA. The code deployed to schema ACCESS_X can then call SA.NEXT_VAL to get the next value and does not need to specify the schema.

Figure 8:
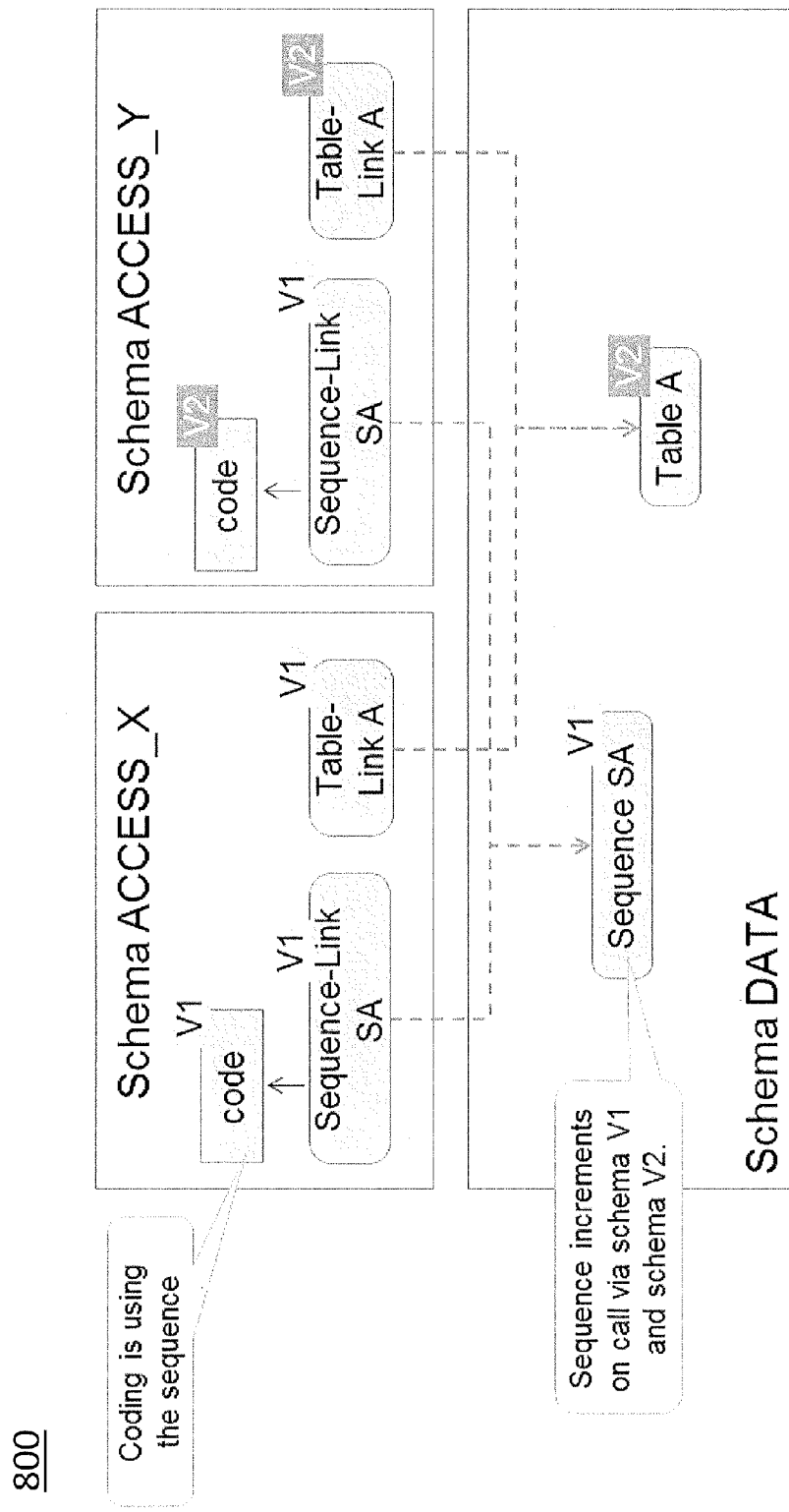
FIG. 8 is a diagram illustrating two access schemas that both access a same sequence in a data schema.

As illustrated in diagram 800 of FIG. 8, the new software is deployed to schema ACCESS_Y. First, the sequence and tables are made visible there with the links: create sequence_link SA for DATA.SA. Then the code is deployed. In the code, the sequence can now be called in the new code as SA.NEXT_VAL.

With this arrangement, both a call from ACCESS_X and ACCESS_Y increase the sequence current value. As using both schemas, the same table is written to and it is ensured no duplicate values are written to the table.

Different issues can arise when migrating sequence values used in application tables. As an initial matter, it needs to be determined, by the application developer, whether a configuration change requires a migration of used sequence numbers.

Depending on the configuration change and the goal of the change by the developer, it can be required to migrate already used sequence numbers. This means, all entries in table fields, which have been created using the sequence must be changed. This applies also to the entries in associated fields in other tables. The decision of the developer (i.e., whether to migrate using the sequence numbers) can be persisted with the application package and be made available to the zero downtime deploy tool.

Another decision relates to whether the table is to be copied during the upgrade or not. There are several reasons which can lead to a table copy. For example, structure migration may require a table copy simply due to the structural changes. In addition, there can be an import of new data which can require a table copy. Further, the developer can specify that there should be sequence number migration.

Figure 9:
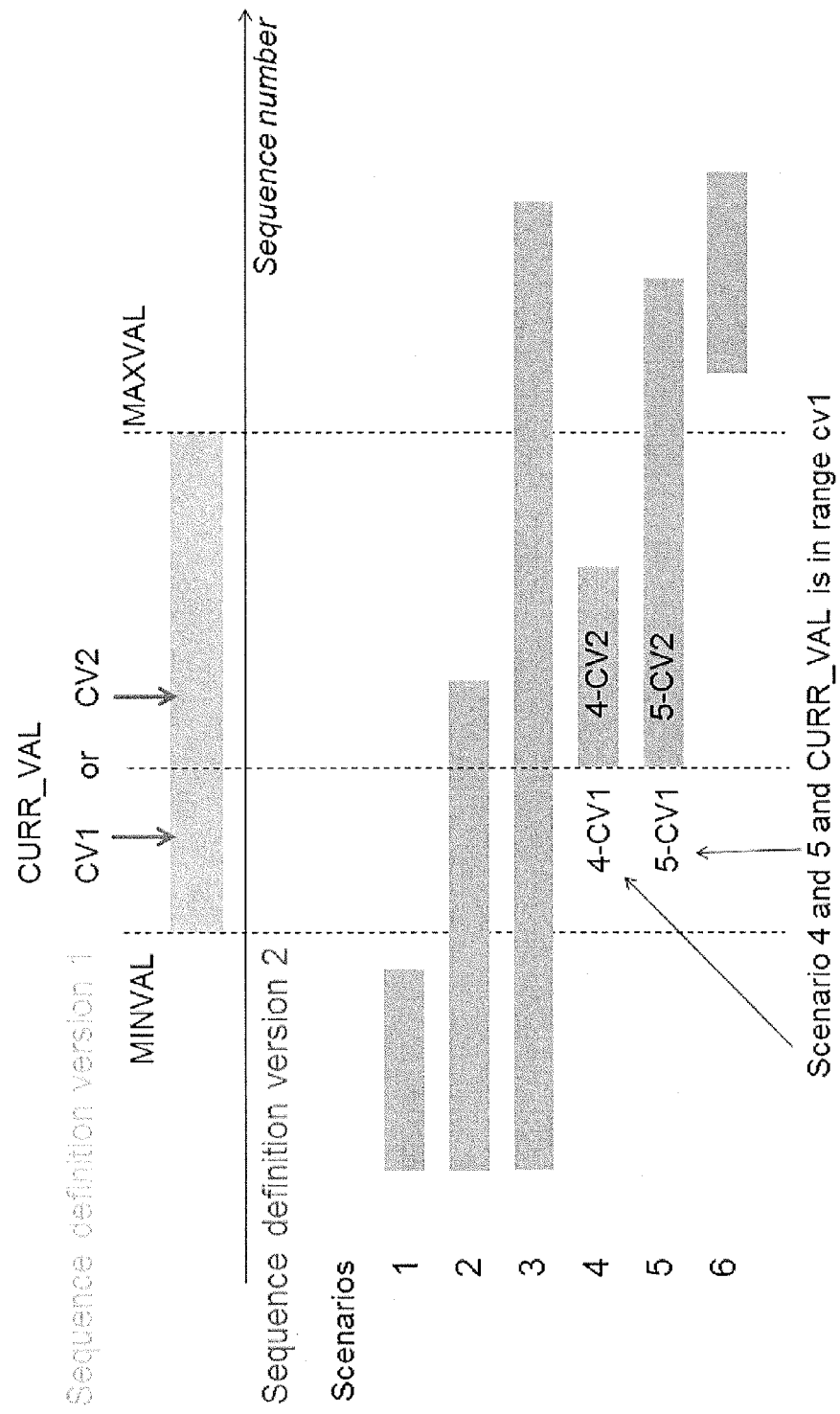
FIG. 9 is a second diagram illustrating how a sequence can be modified.

FIG. 9 is a diagram that illustrates sequence configuration change categories. There can be various scenarios as provided below:

Scenario 1: MINVAL_V2 and MAXVAL_V2 are lower than MINVAL_V1.

Scenario 2: MINVAL_V2 is lower than MINVAL_V1, MAXVAL_V2 is between MINVAL_v1 and MAXVAL_V2.

Scenario 3: MINVAL_V2 is lower than MINVAL_V1, MAXVAL_V2 is larger than MAXVAL_V1.

Scenario 4: MINVAL_V2 is larger than MINVAL_V1 but smaller than MAXVAL_V2, MAXVAL_V2 is smaller than MAXVAL_V1. CV1—the CURR_VAL is below MINVAL_V2 and CV2—the CURR_VAL is above MINVAL_V2.

Scenario 5: MINVAL_V2 is larger than MINVAL_V1 but smaller than MAXVAL_V2, MAXVAL_V2 is larger than MAXVAL_V1. CV1—the CURR_VAL is below MINVAL_V2 and CV2—the CURR_VAL is above MINVAL_V2.

Scenario 6: both MINVAL_V2 and MAXVAL_V2 are larger than MAXVAL_V2.

Further, in some cases, the categorization can be changed from cycle to no-cycle of sequence numbers. In such cases, most likely, the developer wants to have the cycled numbers replaced by non-cycled sequence numbers. This arrangement can require migrating existing sequence numbers and thus a copy of the table. However, foreign table associations cannot be resolved as the original numbers are not unique. The upgrade tools (migration and import) can use the temporary sequence with the set B\A. The sequence V2 must have a larger number range than the original cycling sequence, otherwise there will not be enough unique numbers. Moreover, out of the old range, every old value can be copied if in the new range.

Various types of sequence configuration change strategies can be implemented. For example, is a single sequence used and if so, is there only one table in the data schema or is there a table and a copy in the data schema. Or, is a temporary sequence being used with a table and a copy in the data schema.

The sequence can be handled with two mechanisms. Referring again to FIG. 9, the upgrade can run with one sequence and one table. This arrangement is used for scenarios: (i) 2, only if CUR_VAL<MAXVAL_V2, (ii) 3, (iii) 4, only if CUR_VAL <MAXVAL_V2, and (iv) 5. The upgrade can run with temporary sequences. This latter arrangement is used for scenarios (i) 1, (ii) 2, only if CUR_VAL>=MAXVAL_V2, (iii) 4, only if CUR_VAL>=MAXVAL_V2 (in fact, this suggests, that the old range being bigger is already consumed and does not fit into the new range), (iv) 6, and (v) 7.

If the table is copied due to other reasons, then scenarios 3 and 5 can apply if the same sequence as the original is taken as opposed to a temporary sequence. Scenarios 2 and 4 can apply only if CUR_VAL<MAXVAL_V2; the same sequence as the original can also be taken here as opposed to a temporary sequence. The CUR_VAL can be changed in such scenarios: if (cur-val-old<min-val-new and min-val-new<<max-val-old), set cur-val to min-val-new; this condition means it applies in these scenarios: 4-CV1 and 5-CV1.

Figure 10:
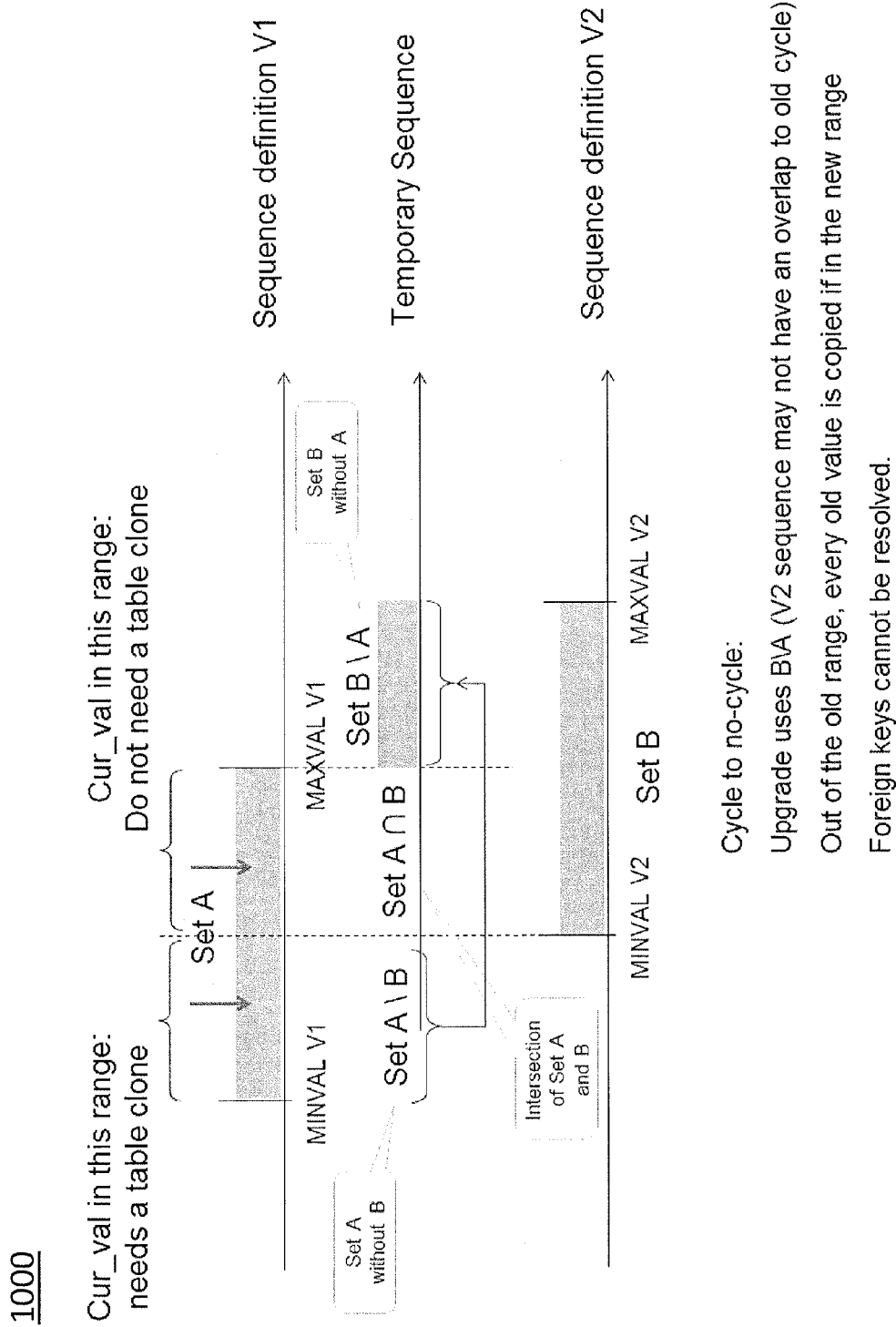
FIG. 10 is a diagram illustrating number sets of two sequence definitions in relation to a temporary sequence.

FIG. 10 is a diagram 1000 that illustrates how number sets of the sequence definition V1, V2 and the temporary sequence. Set A can be defined as the set of numbers for sequence V1, and B as the set of numbers for sequence V2. The temporary sequence has the set B \ A (this is B without A). FIG. 10 also shows the two possible values of the current value of the sequence V1, which is in use.

For migration and update, two cases can be used when data is written. Use case U1 is when the application inserts data. If, CURR_VAL is in A intersection B, the table content is copied and sequence numbers in table are copied. CURR_VAL is in A without B, the table content is copied, the sequence value is mapped to B without A (thus, the temporary sequence is taken). Use case U2 is when an upgrade imports data. The upgrade uses the first sequence (sequence 1) to get next-val. If val is in A intersection B, that sequence is used, otherwise the temporary sequence is used.

Figure 11:
FIG. 11 is a diagram illustrating a setup during an upgrade for a compatible change of a sequence.
Figure 12:
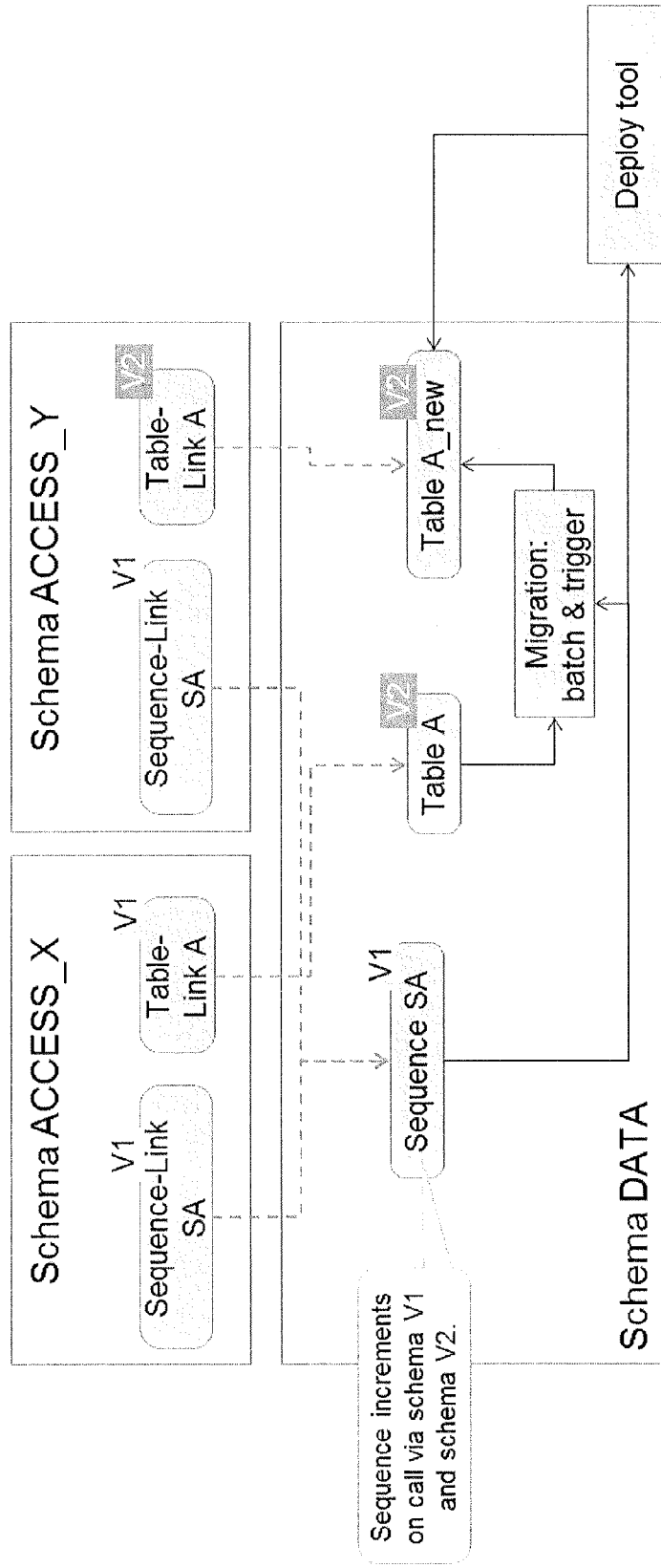
FIG. 12 is a diagram illustrating a setup during an upgrade for a compatible change of a sequence and a table copy due to table migration or data import.

The following as well as diagram 1100 of FIG. 11 relates to a setup that utilizes a single sequence. This is also the scenario, if the table needs to be copied due to other reasons such as table migration due to structure change and deployment of new content to the table (as illustrated in FIG. 12). In particular, FIG. 11 illustrates a setup during upgrade that includes a compatible change of a sequence and FIG. 12 illustrates a setup during upgrade for a compatible change of a sequence and a table copy due to table migration or data import The upgrade can be as follows. First, new schema ACCESS_Y can be created. A sequence link SA can then be created for the sequence SA in the data schema. A table link A can also be created for the table A in the data schema. New code and views can be deployed to the schema ACCESS_Y. If required, the tables can be converted, which requires a table copy. A database migration tool can use the sequence in the V1 definition. The entries in the tables which have been created by the sequence are written to the target table are not changed.

If required, the new content can be deployed to a copied table. The deploy tool can use the sequence in the V1 definition. It is noted that this is not problematic because the ranges are only enlarged or changed in the less restrictive direction. The sequence in the old definition can be used in V2, only limits may be reached earlier than when format version 2 would be used. So this can be accepted for the period during the upgrade.

Once V2 is ready, the users can be switch over to V2 and V1 Can be stopped. The sequence being used by V2 is, at the time of the switchover, still the V1 definition. Next, the sequence can be altered to the V2 definition so that users can use version V2. All objects in schema ACCESS_X can be dropped and schema ACCESS_X can be removed.

Figure 13:
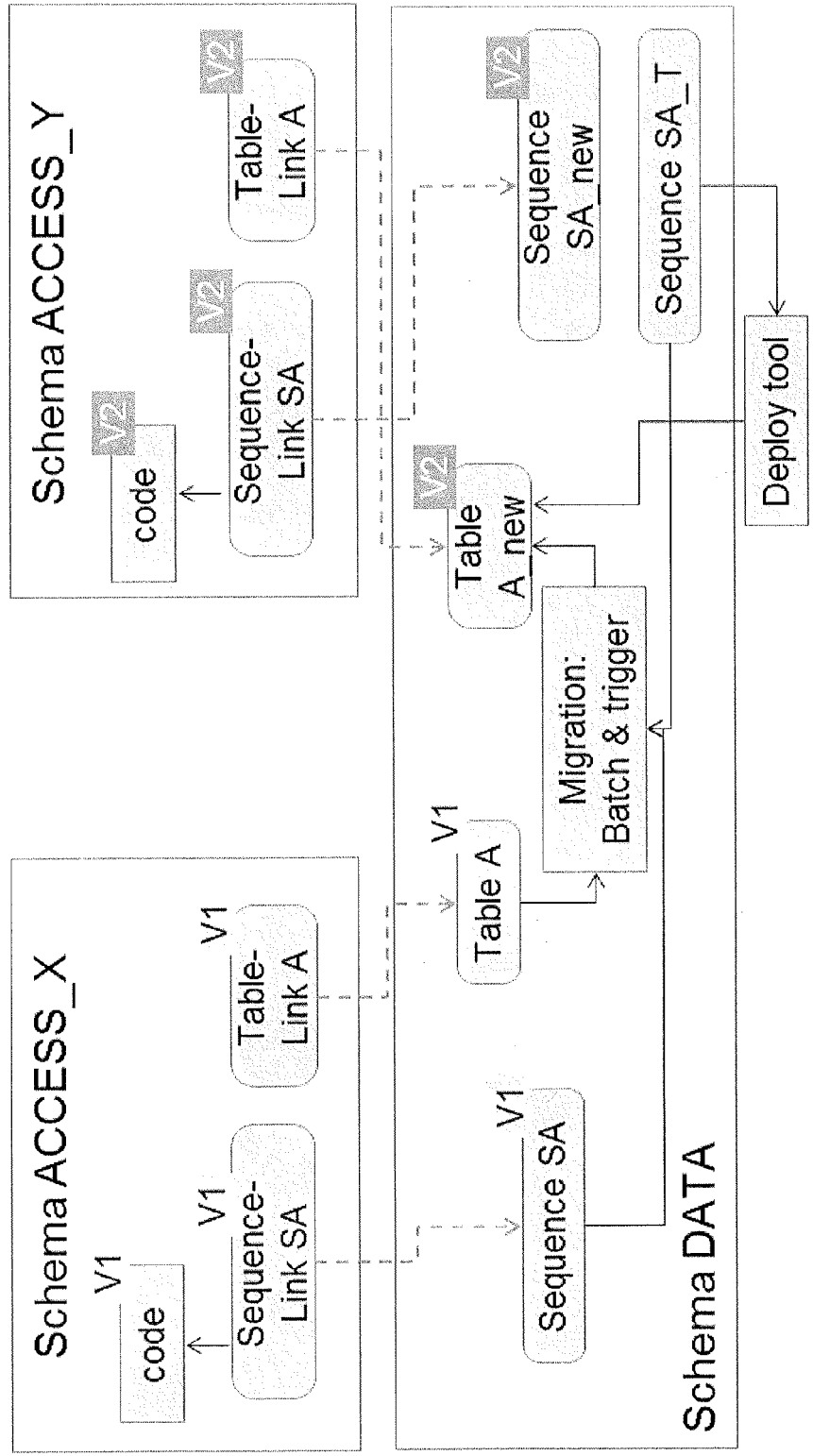
FIG. 13 is a diagram illustrating a setup during an upgrade that uses two tables and three sequences.

FIG. 13 is a diagram 1300 illustrate a setup with a temporary sequence and, in particular a setup during upgrade that uses two tables and three sequences. This is the setup, if the table needs to be cloned. There are three scenarios that require a table to be cloned. The upgrade procedure can include creation of new table A_new. Table link in ACCESS_Y can be created to point to A_new. A new sequence SA_new can be created. The sequence link SA in ACCESS_Y can be created to point to SA_new in data schema. A temporary sequence can be created SA_T. Data migration and replication triggers and stored procedures can be created.

The data can then be migrated from table A to table A_new. A migration tool can use sequence SA or SA_T. If CURR_VAL is in A intersection B, the table content can be copied and the sequence numbers in the table A can be copied. If CURR_VAL is in A without B, the table content can be copied and the sequence value can be mapped to B without A. (thus the temporary sequence SA_T can be taken). Next, new data can be deployed to table A_new. The deployment tool can use sequence SA or SA_T. The upgrade can use sequence 1 to get next-val. If this value is in A intersection B, it is used, otherwise a temporary sequence can be used. After V1 is shut down and before users switched to V2, sequence A_new can be initialized with application defined function for new sequence (typically "max-val" of field holding sequence number+1).

Figure 14:
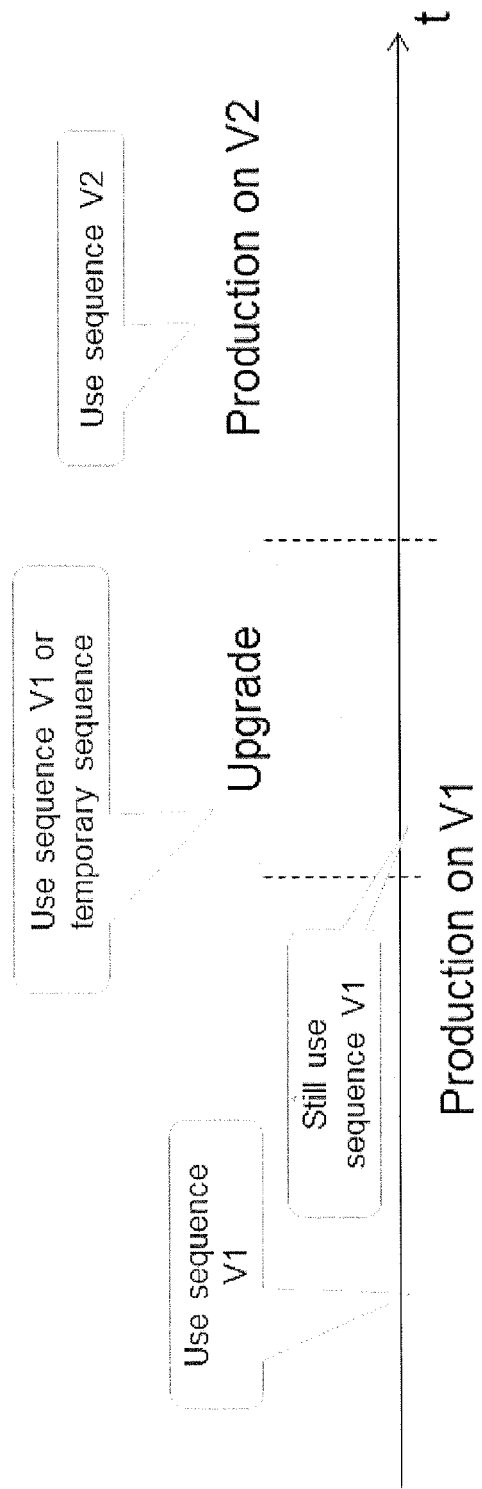
FIG. 14 is a diagram illustrating a timeline when each sequence is used.

FIG. 14 is a diagram 1400 that illustrates which sequence is used at which point in time as part of an upgrade.

FIG. 15 is a process flow diagram 1500 in which, at 1510, an upgrade of a first version of a database application to a second version of a database application that both have a same data schema is initiated. The first database application has a first access schema such that at least one table in the data schema is linked to the first access schema. The second version of the database application has a second access schema such that at least one table in the data schema is linked to the second access schema. The first access schema differs from the second access schema. During the upgrade, at 1520, each access schema is provided access to a first sequence in the data schema for both of the first version of the database application and the second version of the database application. Subsequent to the upgrade, at 1530, the second access schema is provided access to a second sequence in the data schema for the second version of the database application. Further, optionally, at 1540, the at least one database table in the data schema is updated to the second version.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:

initiating an upgrade of a first version of a database application to a second version of a database application that both have a same data schema, the first database application having a first access schema such that at least one database table in the data schema is linked to the first access schema, the second version of the database application having a second access schema such that the at least one database table in the data schema is linked to the second access schema, the first access schema differing from the second access schema;

providing, for each access schema during the upgrade, access to a first sequence in the data schema for both of the first version of the database application and the second version of the database application, the first sequence being configured to provide a first unique value for at least one new row of data that is inserted into the at least one database table during the upgrade, the first unique value being between a first minimum value and a first maximum value, and the first unique value being provided by at least applying a first increment; and providing, for the second access schema subsequent to the upgrade, access to a second sequence in the data schema for the second version of the database application, the second sequence being configured to provide a second unique value for at least another new row of data that is inserted into the at least one database table subsequent to the upgrade, the second unique value being between a second minimum value and a second maximum value, the second unique value being provided by at least applying a second increment, and at least one of the second minimum value, the second maximum value, and the second increment being different from the first minimum value, the first maximum value, and the first increment.

2. The method of claim 1, wherein the first sequence is a sequence used by the first version of the database application prior to the upgrade.

3. The method of claim 1, wherein the first sequence is a temporary sequence that is different from a sequence used by the first version of the database application prior to the upgrade.

4. The method of claim 1, wherein the access to the first sequence is enabled by a respective at least one sequence pointer in each of the first access schema and the second access schema.

5. The method of claim 1, wherein the concurrent access is enabled by a field in a respective at least one table in each of the first access schema and the second access schema.

6. The method of claim 1 further comprising:
migrating values from the first sequence from a first database table in the data schema to a second database table in the data schema.

7. The method of claim 1 further comprising:
mapping values from the first sequence from a first database table in the data schema to a second database table in the data schema.

8. The method of claim 1 further comprising:
providing, for each access schema, concurrent access to at least one database table in the data schema to both the first version of the database application and the second version of the database application, the concurrent access being enabled by a respective at least one table link object in each of the first access schema and the second access schema that is used by database views or stored procedures such access schema.

9. The method of claim 8 further comprising:
updating, using at least one application trigger associated with the at least one table link object, the at least one database table in the data schema to reflect changes in a corresponding table link object.

10. The method of claim 9, wherein there is a first application trigger in the first access schema on the first table link and a second application trigger in the second access schema on a second table link, wherein only the first trigger is called if the table in the data schema is updated through the first table link object in the first access schema and only the second trigger is called if the table in the data schema is updated through the second table link object in the second access schema.

11. The method of claim 8, wherein the at least one table link specifies a select field list of the at least one table in the data schema, wherein the list of fields specified by the table link object is smaller than the list of fields of the table.

12. The method of claim 8, wherein the at least one table link object is used by a database object that cannot use a database view.

13. The method of claim 8, wherein at least one of the table link object specifies a calculated field.

14. The method of claim 13, wherein the calculated field is transient.

15. The method of claim 8, wherein the at least one table link object references a table in the data schema that specifies a calculated field.

16. The method of claim 1, wherein the database application is executed using an in-memory database system.

17. A system comprising:
at least one data processor; and
memory storing instructions which, when executed by the at least one data processor, result in operations comprising:

initiating an upgrade of a first version of a database application to a second version of a database application that both have a same data schema, the first database application having a first access schema such that at least one database table in the data schema is linked to the first access schema, the second version of the database application having a second access schema such that the at least one database table in the data schema is linked to the second access schema, the first access schema differing from the second access schema;

providing, for each access schema during the upgrade, access to a first sequence in the data schema for both of the first version of the database application and the second version of the database application, the first sequence being configured to provide a first unique value for at least one new row of data that is inserted into the at least one database table during the upgrade, the first unique value being between a first minimum value and a first maximum value, and the first unique value being provided by at least applying a first increment; and providing, for the second access schema subsequent to the upgrade, access to a second sequence in the data schema for the second version of the database application, the second sequence being configured to provide a second unique value for at least another new row of data that is inserted into the at least one database table subsequent to the upgrade, the second unique value being between a second minimum value and a second maximum value, the second unique value being provided by at least applying a second increment, and at least one of the second minimum value, the second maximum value, and the second increment being different from the first minimum value, the first maximum value, and the first increment.

18. The system of claim 17, wherein the first sequence is a sequence used by the first version of the database application prior to the upgrade.

19. The system of claim 17, wherein the first sequence is a temporary sequence that is different from a sequence used by the first version of the database application prior to the upgrade.

20. A non-transitory computer program product storing instructions which, when executed by at least one computing device forming part of at least one computing system, result in operations comprising:

initiating an upgrade of a first version of a database application to a second version of a database application that both have a same data schema, the first database application having a first access schema such that at least one database table in the data schema is linked to the first access schema, the second version of the database application having a second access schema such that the at least one database table in the data schema is linked to the second access schema, the first access schema differing from the second access schema;

providing, for each access schema during the upgrade, access to a first sequence in the data schema for both of the first version of the database application and the second version of the database application, the first sequence being configured to provide a first unique value for at least one new row of data that is inserted into the at least one database table during the upgrade, the first unique value being between a first minimum value and a first maximum value, and the first unique value being provided by at least applying a first increment; and providing, for the second access schema subsequent to the upgrade, access to a second sequence in the data schema for the second version of the database application, the second sequence being configured to provide a second unique value for at least another new row of data that is inserted into the at least one database table subsequent to the upgrade, the second unique value being between a second minimum value and a second maximum value, the second unique value being provided by at least applying a second increment, and at least one of the second minimum value, the second maximum value, and the second increment being different from the first minimum value, the first maximum value, and the first increment.

* * * * *